US011242889B2

(12) United States Patent
Cuddy et al.

(10) Patent No.: US 11,242,889 B2
(45) Date of Patent: Feb. 8, 2022

(54) ADJUSTABLE TIE RODS AND RELATED METHODS

(71) Applicant: The Boeing Company, Chicago, IL (US)

(72) Inventors: Nathanial C. Cuddy, Snohomish, WA (US); Samuel Alexander Mori, Everett, WA (US); Jonah Gary Hanson, Arlington, WA (US); Allyssa Katherine Young, Sumner, WA (US)

(73) Assignee: The Boeing Company, Chicago, IL (US)

( * ) Notice: Subject to any disclaimer, the term of this patent is extended or adjusted under 35 U.S.C. 154(b) by 320 days.

(21) Appl. No.: 16/555,416

(22) Filed: Aug. 29, 2019

(65) Prior Publication Data

US 2021/0062861 A1 Mar. 4, 2021

(51) Int. Cl.
*F16C 7/06* (2006.01)
*B64C 19/00* (2006.01)

(52) U.S. Cl.
CPC ............... *F16C 7/06* (2013.01); *B64C 19/00* (2013.01); *F16C 2326/43* (2013.01)

(58) Field of Classification Search
CPC ........ F16C 7/06; F16C 2326/43; B64C 19/00; F16H 25/20; F16H 2025/2084
See application file for complete search history.

(56) References Cited

U.S. PATENT DOCUMENTS 3,884,040 A 5/1975 Green
7,207,854 B1 4/2007 Anderson, Jr. et al.
8,696,232 B2 4/2014 Sokolihs
9,021,903 B2 * 5/2015 Elliott ...................... B64C 9/02
74/89
2002/0071719 A1 6/2002 Moore
2004/0005824 A1 1/2004 Zeiger
(Continued)

FOREIGN PATENT DOCUMENTS

DE         4422529 A1 * 5/1995 ............. F16H 19/00
DE     202011051135       8/2011
GB        2175637 A  * 12/1986 ............. F16L 33/08

OTHER PUBLICATIONS

European Patent Office, Extended European Search Report for related European Patent No. 20180165, dated Dec. 1, 2020.
(Continued)

*Primary Examiner* — Thomas C Diaz
(74) *Attorney, Agent, or Firm* — Dascenzo Gates Intellectual Property Law, P.C.

(57) ABSTRACT

An adjustable tie rod includes a first end defined by a screw rod, wherein the screw rod includes a threaded portion, and a second end opposite the first end, wherein an overall length of the adjustable tie rod is defined as a distance between the first end and the second end along a longitudinal axis of the adjustable tie rod. A tie rod shaft extends between and couples the first end and the second end, and a gearbox is fixed with respect to the tie rod shaft. An adjustment actuator is operatively coupled to the gearbox such that selective actuation of the adjustment actuator causes translation of the screw rod along the longitudinal axis and with respect to the gearbox when the first end is prevented from rotating about the longitudinal axis, thereby adjusting the overall length of the adjustable tie rod.

20 Claims, 10 Drawing Sheets

(56) References Cited

U.S. PATENT DOCUMENTS

2010/0096498 A1* 4/2010 McKay ............... F16H 25/2021
244/99.2
2019/0257397 A1* 8/2019 Wilkins ................... F16B 7/14

OTHER PUBLICATIONS

Machine-generated English language translation of DE 202011051135, downloaded from Google Patents on Feb. 23, 2021.

* cited by examiner

ADJUSTABLE TIE RODS AND RELATED METHODS

FIELD

The present disclosure relates generally to adjustable tie rods and related methods, and more particularly to tie rods that are configured to be adjusted in-place within a structure and/or while under load.

BACKGROUND

Two force members, such as tie rods, are structural components having pins or hinge supports at both ends that are designed to withstand tensile and/or compressive loads along the longitudinal axis of the two force members. Such two force members are commonly used in various industries, including but not limited to aviation, automotive, mass transit, and static construction, to tie one structural member to another, and/or to transfer movement and forces across components. For example, in aircraft, tie rods may be used to transfer forces across cabin equipment, floor panels, walls, stow bins, closets, and/or crew quarters.

During assembly, manufacturing, production, and/or installation of structures, such as an aircraft, tolerance variations and stack-ups may accumulate. To accommodate and/or account for such tolerance variations, adjustable two force members are sometimes employed. Often, these adjustable two force members may be rotated to adjust the length of the two force members. However, such two force members are installed with both ends pinned into place such that neither end can rotate to adjust the length, thus, the two force members must be unloaded and unpinned in order to adjust the length. In some cases, one or more installed components must be removed to access the two force members, thereby introducing unwanted inefficiencies and delays. For example, in aircraft applications, the installed components may be quite large and heavy, and thus difficult to remove to adjust the length of the two force members. Furthermore, such adjustments to conventional two force members may require the use of tools and/or may require complete removal of the two force members from the assembly. This often results in given installations taking multiple attempts via trial and error approaches.

SUMMARY

To address these and other issues in the prior art, presently disclosed adjustable two force members (e.g., adjustable tie rods) may be configured to be adjusted without the use of tools, and/or without needing to uninstall or unpin either end of the tie rod or other two force member. Disclosed adjustable tie rods may be configured to provide finite adjustability under loaded or unloaded conditions to account for and accommodate assembly and installation tolerance variations and stack-ups.

One disclosed example of such an adjustable tie rod includes a screw rod that defines a first end of the adjustable tie rod, wherein an overall length of the adjustable tie rod is defined as a distance between the first end and a second end of the adjustable tie rod, along a longitudinal axis of the adjustable tie rod. A tie rod shaft may extend between and couple the first end and the second end, and a gearbox may be fixed with respect to the tie rod shaft. Such adjustable tie rods also may include an adjustment actuator operatively coupled to the gearbox such that selective actuation of the adjustment actuator causes translation of the screw rod along the longitudinal axis and with respect to the gearbox when the first end is prevented from rotating about the longitudinal axis, thereby adjusting the overall length of the adjustable tie rod. For example, the screw rod may include a threaded portion engaged with the gearbox such that rotation of one or more gears of the gearbox causes more or less of the threaded portion to be positioned within the gearbox, thereby adjusting the overall length of the adjustable tie rod by longitudinally translating the screw rod into or out of the gearbox.

Disclosed methods may include securing a first end and a second end of an adjustable tie rod such that the first end and the second end are prevented from rotating about a longitudinal axis of the adjustable tie rod, and rotating an adjustable knob (or actuating a different adjustment actuator), thereby adjusting the overall length of the adjustable tie rod by translating the screw rod along the longitudinal axis, with respect to the gearbox and the tie rod shaft.

DESCRIPTION

Figure 1:
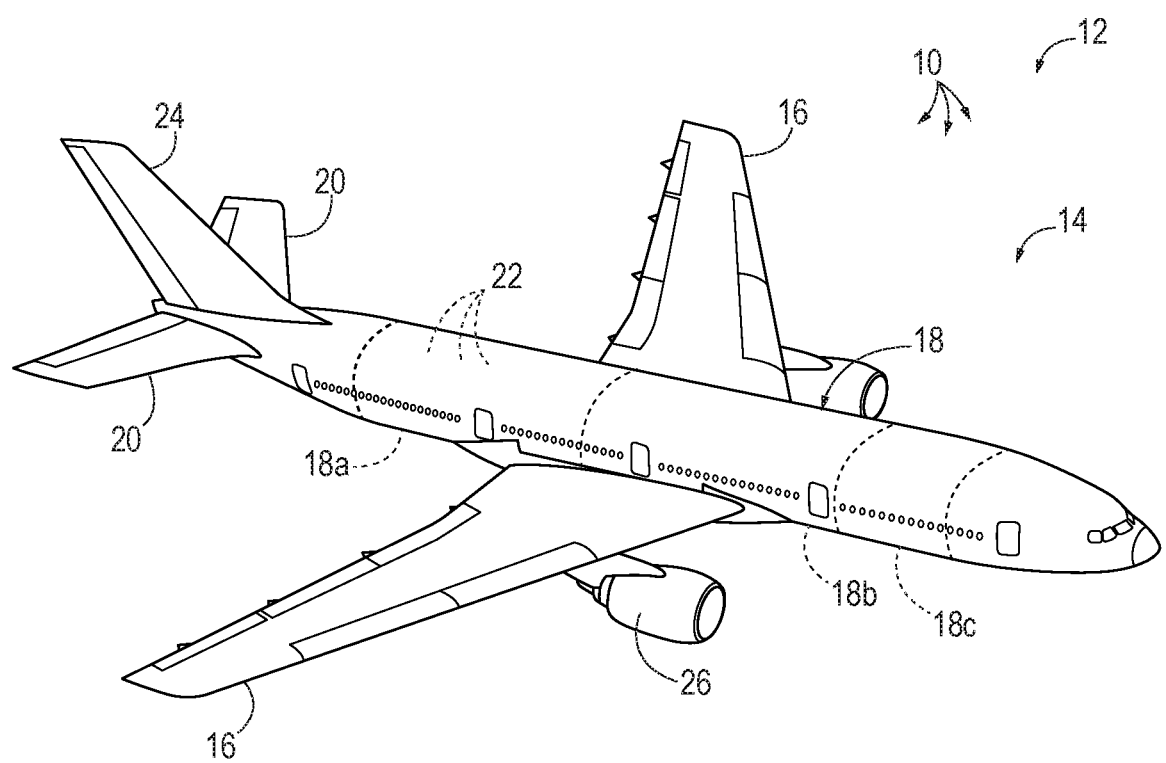
FIG. 1 is a perspective view of an aircraft which may include one or more presently disclosed adjustable tie rods.

With reference to FIG. 1, one or more adjustable two force members 10 may be included in an apparatus 12. Adjustable two force members 10 may be utilized in many different industries and applications, such as aerospace, automotive, electronic, construction, military, recreation, and/or motorsport industries. In FIG. 1, an example of apparatus 12 that may include one or more adjustable two force members 10 generally is illustrated in the form of an aircraft 14. Aircraft 14 may take any suitable form, including commercial aircraft, military aircraft, or any other suitable aircraft. While FIG. 1 illustrates aircraft 14 in the form of a fixed wing aircraft, other types and configurations of aircraft are within the scope of aircraft 14 according to the present disclosure, including (but not limited to) rotorcraft and helicopters.

Apparatus 12 (e.g., aircraft 14) may include one or more adjustable two force members 10. As illustrative, non-exclusive examples, adjustable two force members 10 may be utilized in such aircraft structures as wings 16, fuselages 18 or fuselage sections 18a, 18b, 18c, horizontal stabilizers 20, overhead storage bins 22, vertical stabilizers 24, and engine housings 26; however, other components of aircraft 14 additionally or alternatively may include one or more adjustable two force members 10. Other applications in aircraft 14 for adjustable two force members 10 may include floor panels, interior walls, food handling galley assemblies, wing control surfaces, passenger storage racks, thrust deflector assemblies, capsule panels, ablative shields for nose cones, instrumentation enclosures and shelves, and bulkhead panels. In other industries, examples of apparatus 12 (including one or more adjustable two force members 10) may include or be a portion of space satellites, electronic radome construction, transit vehicles, shipping containers, shelters, large antennae or disk reflectors, refrigeration panels, rapid transit floor panels, shipboard electronic deck shelters, cargo pallets, automobile bodies, architectural curtain walls, partitions, divider panels, expandable hospital shelters, and/or interior structures of an assembly.

Figure 2:
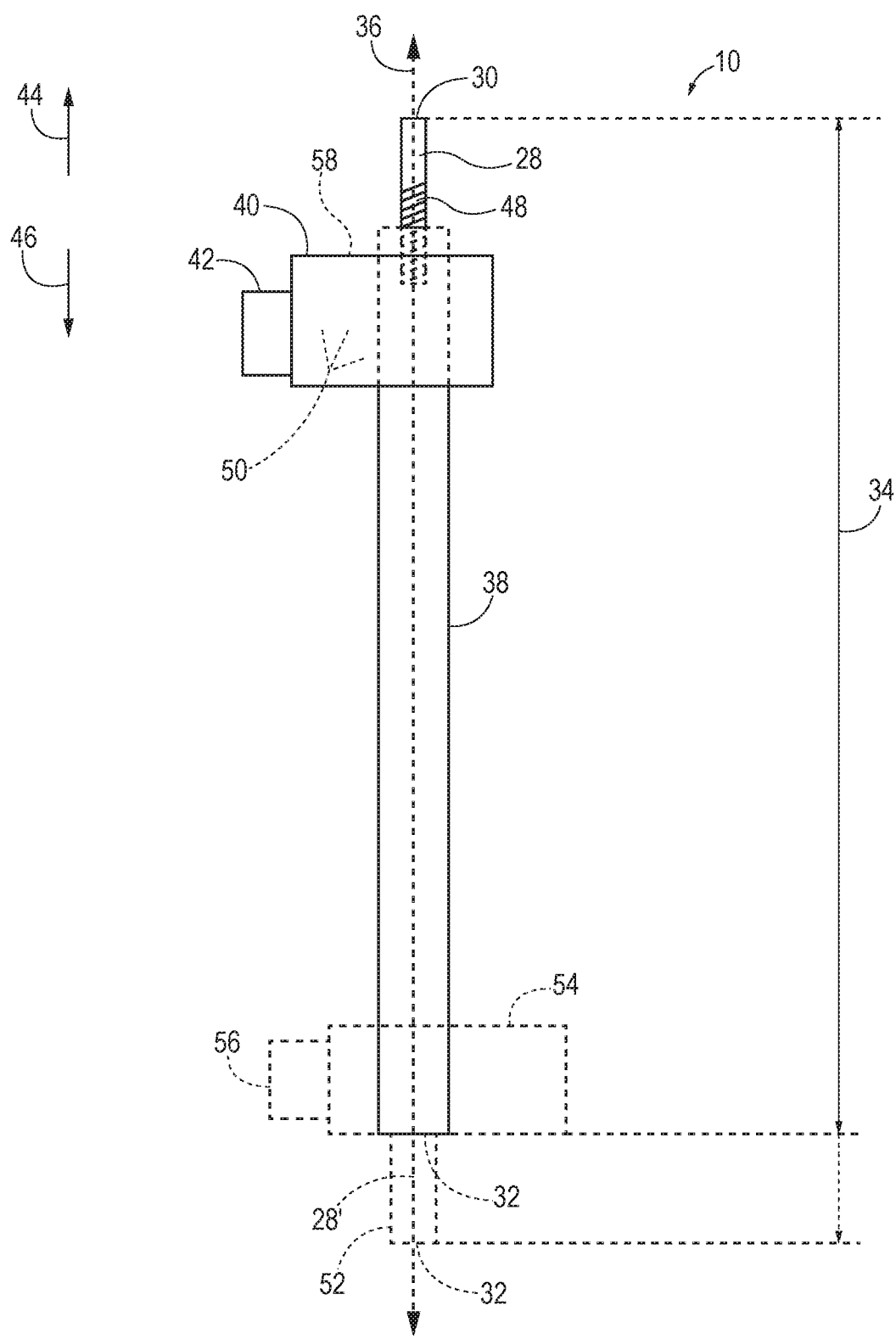
FIG. 2 is a schematic, black-box representation of presently disclosed two force members.

FIG. 2 provides illustrative, non-exclusive examples of adjustable two force members 10 according to the present disclosure. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a given example without departing from the scope of the present disclosure.

Adjustable two force member 10 includes a screw rod 28 that defines a first end 30 of adjustable two force member 10. Adjustable two force member 10 has a second end 32 opposite first end 30, and an overall length 34 defined by the distance between first end 30 and second end 32 along a longitudinal axis 36 of adjustable two force member 10. A shaft body 38 extends between and couples first end 30 and second end 32. In order to adjust overall length 34 of adjustable two force member 10 (e.g., in order to selectively increase or decrease overall length 34), adjustable two force member 10 includes a gearbox 40 fixed with respect to shaft body 38, and an adjustment actuator 42. Adjustment actuator 42 is operatively coupled to gearbox 40 such that selective actuation of adjustment actuator 42 causes translation of screw rod 28 along longitudinal axis 36, thereby adjusting overall length 34. For example, longitudinal translation of screw rod 28 in a first direction (e.g., along arrow 44) increases overall length 34, whereas longitudinal translation of screw rod 28 in a second direction (e.g., along arrow 46) decreases overall length 34. Such longitudinal translation of screw rod 28 occurs with respect to gearbox 40.

Figure 5:
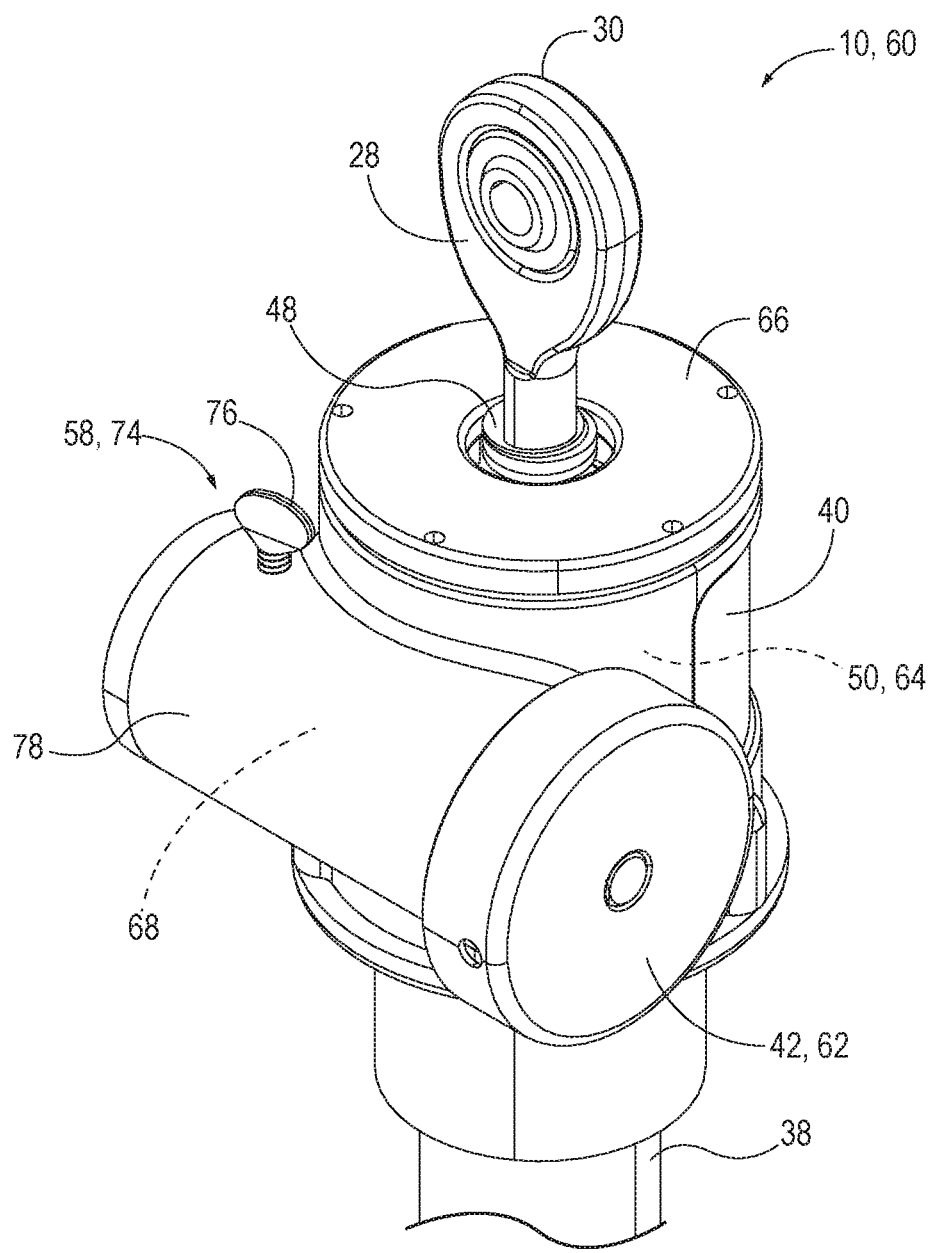
FIG. 5 is a perspective view of a portion of an example of a presently disclosed adjustable tie rod.

Screw rod 28 includes a threaded portion 48, with at least a portion of threaded portion 48 being positioned within, or located within, gearbox 40. Gearbox 40 includes at least one gear 50 that engages with threaded portion 48 of screw rod 28 to effectuate longitudinal translation of screw rod 28. While a portion of screw rod 28 is positioned internally within gearbox 40, at least a portion of screw rod 28 is positioned externally to gearbox 40. For example, first end 30 is positioned externally to gearbox 40. A portion of threaded portion 48 also may be positioned externally to gearbox 40 (e.g., as shown in FIG. 5), depending on the particular specifications of adjustable two force member 10 and/or depending on the current adjusted overall length 34 of adjustable two force member 10. In some examples, first end 30 is prevented from rotating about longitudinal axis 36 as overall length 34 is adjusted. For example, first end 30 may be coupled or loaded within a structure (e.g., aircraft 14) while overall length 34 is adjusted. In other examples, first end 30 may be permitted to rotate about longitudinal axis 36 during adjustment of overall length 34.

Adjustable two force member 10 may be configured for continuous adjustment of overall length 34 via adjustment actuator 42. Additionally or alternatively, adjustable two force member 10 may be configured for discrete adjustment of overall length 34 between at least two different settings, configurations, or different overall lengths, via adjustment actuator 42. Adjustment actuator 42 may be any suitable adjustment means, including but not limited to a push button, an electronic control, a dial, a knob, a ratchet, and/or a switch. Other suitable adjustment mechanisms for adjustment actuator 42 will be apparent to those of ordinary skill in the art. Some examples of adjustable two force member 10 may include a locking mechanism 58 that, when engaged, prevents further adjustment of adjustable two force member 10 until locking mechanism 58 is selectively disengaged. Additionally or alternatively, adjustable two force member 10 may be self-locking due to friction between gears 50 of gearbox 40.

Second end 32 may be defined by a clevis rod end 52 or other rod end, in some examples. In other examples, and as indicated by 32', second end 32 may be defined by shaft body 38. In some examples, second end 32 may be defined by a second screw rod 28'. End interfaces for first end 30 and second end 32 may be interchangeable in various examples of adjustable two force members 10. In some examples, overall length 34 is adjustable only by longitudinally translating screw rod 28. In other examples, overall length 34 additionally or alternatively may be adjustable by longitudinally translating second screw rod 28' or clevis rod end 52 via a second gearbox 54 and a second adjustment actuator 56. In other words, selective actuation of second adjustment actuator 56 may be configured to cause translation of second end 32 along longitudinal axis 36 to adjust overall length 34 of adjustable two force member 10. In some examples, second end 32 is prevented from rotating about longitudinal axis 36 during such adjustment.

Such adjustability according to the present disclosure may be adapted and utilized with any two force member including tie rods, I-beams, and square ties, among others. Additionally, dimensions of gearbox 40, adjustment actuator 42, and various other components may be scaled up or down depending on the loads supported by two force member 10. Disclosed adjustability features may be provided on existing tie rods and other two force members, to retrofit the same with such in-place adjustability. Disclosed adjustable two force members 10 may be configured to be adjusted by applying a small load, and thus may be ergonomically advantageous as compared to conventional two force members that may require tools to adjust. Additionally or alternatively, disclosed adjustable two force members 10 may be configured to provide smaller adjustability increments than are available in conventional tie rods.

Turning now to FIGS. 3-13, illustrative non-exclusive examples of two force members 10 in the form of adjustable tie rods 60 and components thereof are illustrated. Where appropriate, the reference numerals from the schematic illustration of FIG. 2 are used to designate corresponding parts of adjustable tie rods 60, however, the examples of FIGS. 3-13 are non-exclusive and do not limit two force members 10 to the illustrated examples of FIGS. 3-13. That is, two force members 10 are not limited to the specific examples of the illustrated adjustable tie rods 60 and may incorporate any number of the various aspects, configurations, characteristics, properties, etc. of two force members 10 that are illustrated in and discussed with reference to the schematic representation of FIG. 2 and/or the examples of FIGS. 3-13, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to adjustable tie rods 60, however, it is within the scope of the present disclosure that the previously discussed features, variants, etc. may be utilized with the same.

Elements that serve a similar, or at least substantially similar, purpose are labeled with like numbers in each of FIGS. 3-13, and these elements may not be discussed in detail herein with reference to each of FIGS. 3-13. Similarly, all elements may not be labeled in each of FIGS. 3-13, but reference numerals associated therewith may be utilized herein for consistency. Elements, components, and/or features that are discussed herein with reference to one or more of FIGS. 3-13 may be included in and/or utilized with any of FIGS. 3-13 without departing from the scope of the present disclosure.

Figures 3, 4:
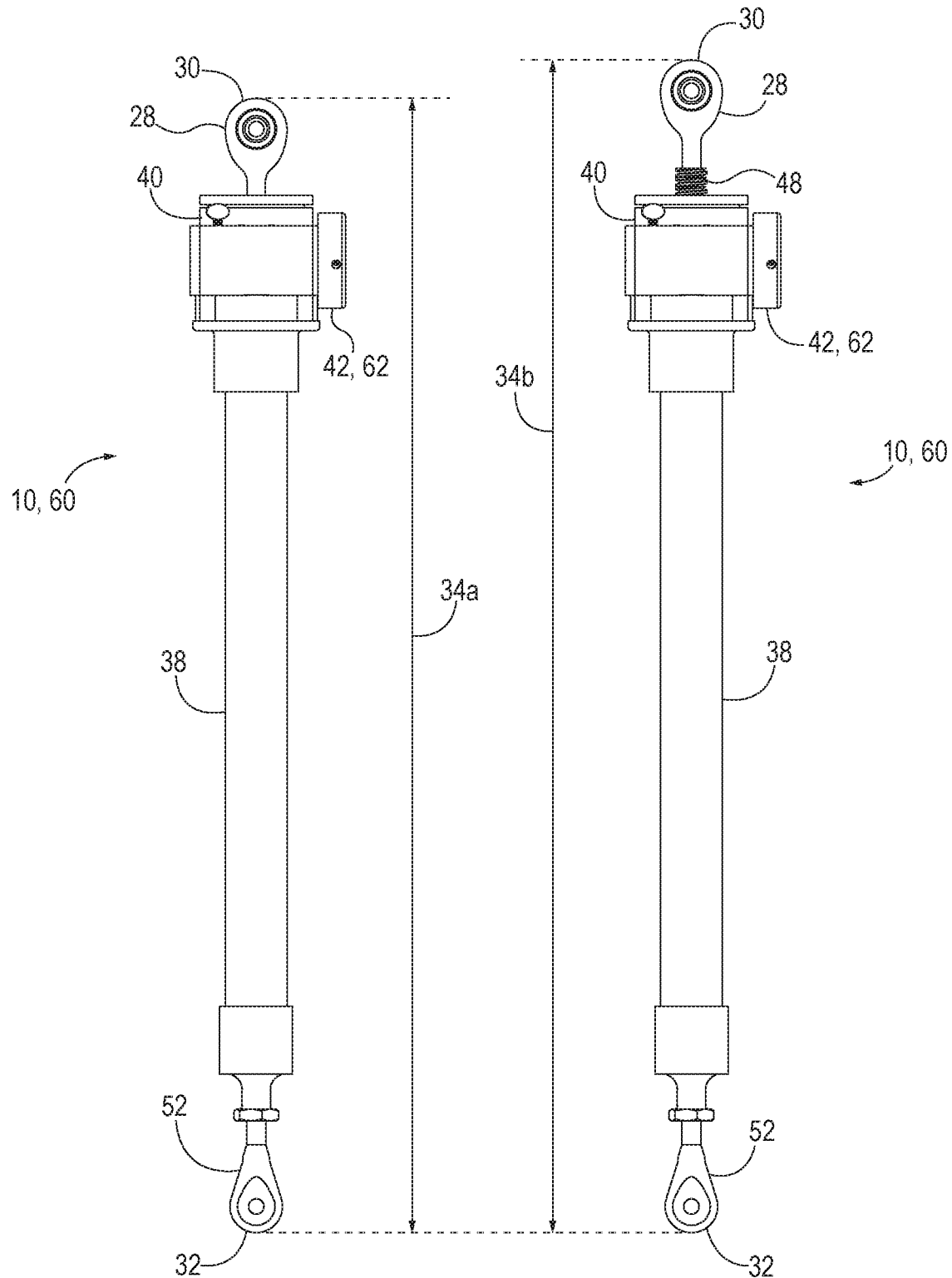
FIG. 3 is an elevation view of an example of a presently disclosed adjustable tie rod, shown in a configuration having a minimum overall length.
FIG. 4 is an elevation view of the adjustable tie rod of FIG. 3, shown in a configuration having a maximum overall length.

FIGS. 3-4 illustrate an adjustable tie rod 60, which is an example of adjustable two force member 10. Adjustable tie rod 60 is illustrated in a first configuration in FIG. 3, showing a minimum overall length 34a of adjustable tie rod 60. Adjustable tie rod 60 is illustrated in a second configuration in FIG. 4, showing a maximum overall length 34b of adjustable tie rod 60. As apparent from comparing FIGS. 3 and 4, screw rod 28 has been longitudinally translated to increase the overall length to maximum overall length 34b, such that a greater proportion of screw rod 28 is positioned internally within gearbox 40 in the shorter configuration of FIG. 3 than in the longer configuration of FIG. 4. By comparison a greater proportion of screw rod 28 is positioned externally to gearbox 40 in the longer configuration of FIG. 4 than in the shorter configuration shown in FIG. 3.

To adjust the overall length 34 of adjustable tie rod 60 between minimum overall length 34a (FIG. 3) and maximum overall length 34b (FIG. 4), adjustable tie rod 60 includes adjustment actuator 42, in the form of an adjustable knob 62, operatively coupled to gearbox 40 such that selective rotation of adjustable knob 62 causes translation of screw rod 28 along longitudinal axis 36 (FIG. 6) and with respect to gearbox 40. For example, selective rotation of adjustable knob 62 in a first direction (e.g., clockwise) may increase overall length 34, whereas selective rotation of adjustable knob 62 in a second, opposite direction (e.g., counter-clockwise) may decrease overall length 34. Of course, in other examples, selective rotation of adjustable knob 62 in a counter-clockwise direction may increase overall length 34, whereas selective rotation of adjustable knob 62 in a clockwise direction may decrease overall length 34. In examples of adjustable tie rod 60 having an adjustment actuator 42 other than adjustable knob 62, different actuation may effectuate increases and decreases in overall length 34. For example, flipping a switch and/or pushing one or more buttons may be utilized to selectively adjust overall length 34 in various examples of adjustable tie rod 60.

Such adjustment of overall length 34 of adjustable tie rod 60 is possible even when first end 30 and second end 32 are prevented from rotating about longitudinal axis 36. For example, overall length 34 of adjustable tie rod 60 may be selectively adjusted by turning adjustable knob 62, even when adjustable tie rod 60 is installed in an aircraft or other assembly or structure. In this manner, overall length 34 of adjustable tie rod 60 is configured to be selectively adjusted without removing adjustable tie rod 60 after it has been installed and/or loaded (i.e. when adjustable tie rod 60 is in-place in a structural assembly and/or under load). In some examples, overall length 34 of adjustable tie rod 60 is configured to be adjusted without requiring the use of tools. In other words, gears 50 of gearbox 40 and adjustable knob 62 may be configured to be engaged such that adjustment may be performed by hand.

As shown in the example of FIGS. 3-4, gearbox 40 may be positioned adjacent first end 30 in some examples, such that gearbox 40 is closer to first end 30 than to second end 32. Additionally or alternatively, gearbox 40 (and/or second gearbox 54) may be positioned adjacent second end 32 (e.g., closer to second end 32 than to first end 30), in some examples. Gearbox 40 may be sized and shaped to fit within existing structural assemblies.

Figure 6:
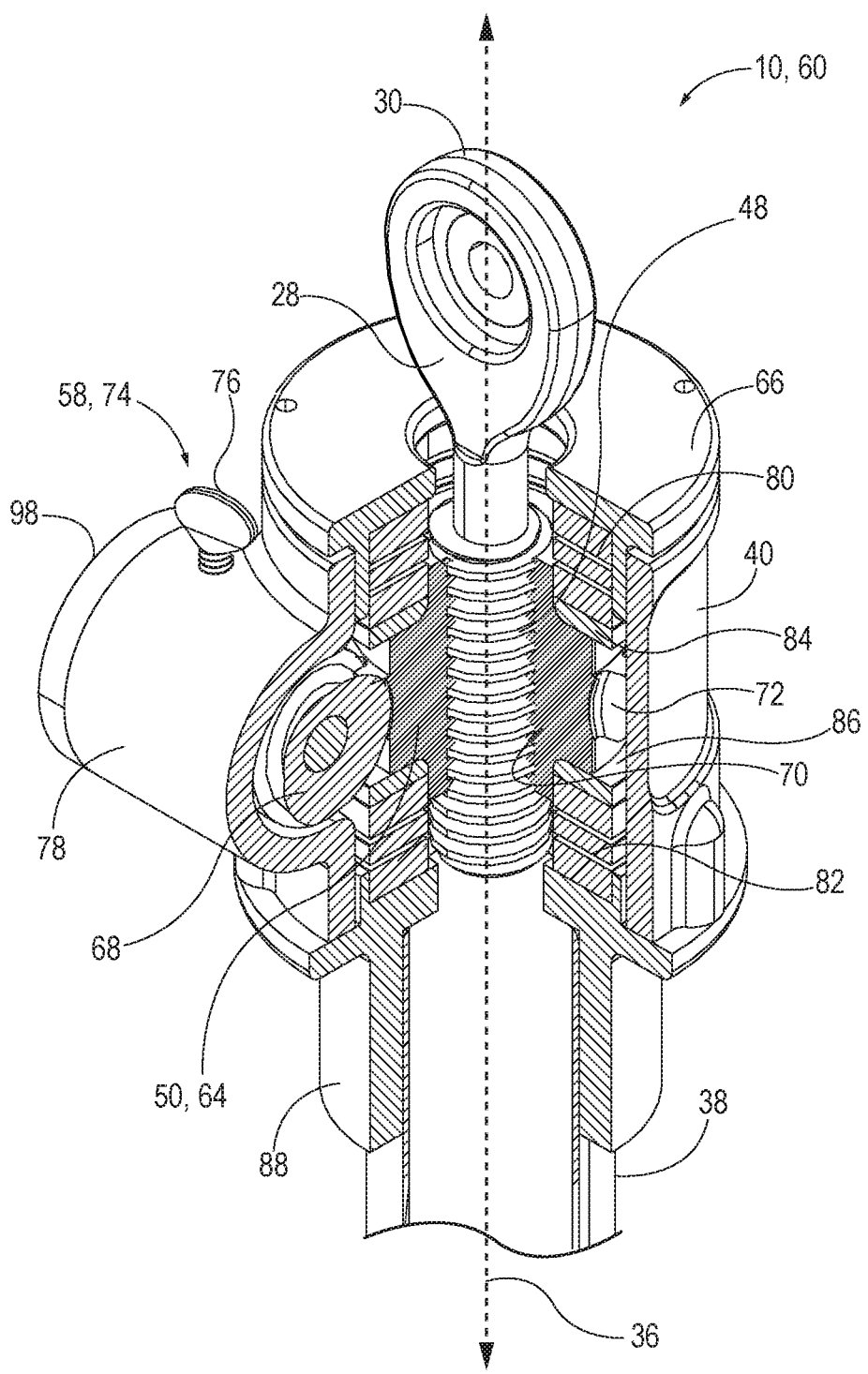
FIG. 6 is a partial cutaway view of the adjustable tie rod of FIG. 5.

Turning now to FIGS. 5-6, a close-up of a portion of adjustable tie rod 60 is shown in a perspective view (FIG. 5) and a partial cutaway view (FIG. 6). A greater proportion of screw rod 28 is positioned externally to gearbox 40 in FIG. 5 than in FIG. 6, as can be seen from comparing threaded portion 48 with respect to an upper cap 66 secured to gearbox 40. Within gearbox 40, a planetary gear 64 (which is an example of gear 50) is rotatably engaged with at least a portion of threaded portion 48 of screw rod 28. In this example, a worm gear 68 is coupled to adjustable knob 62 such that selective rotation of adjustable knob 62 rotates worm gear 68. Worm gear 68 is positioned to engage with planetary gear 64 (e.g., via an external threaded region 72 of planetary gear 64) such that rotation of worm gear 68 causes corresponding rotation of planetary gear 64 about longitudinal axis 36. In other words, selective rotation of adjustable knob 62 both causes rotation of worm gear 68 and also thereby causes rotation of planetary gear 64 about longitudinal axis 36. Such rotation of planetary gear 64 causes longitudinal translation of screw rod 28 along longitudinal axis 36 when first end 30 is prevented from rotating about longitudinal axis 36 by virtue of engagement between an internal threaded region 70 of planetary gear 64 and threaded portion 48 of screw rod 28.

As best seen in FIG. 6, at least a portion of threaded portion 48 is positioned within gearbox 40, such as within planetary gear 64 in the example of adjustable tie rod 60. In this manner, a portion of threaded portion 48 is engaged with internal threaded region 70 of planetary gear 64. Internal threaded region 70 may comprise internal acme threads in some examples, though other types of threads are also within the scope of the present disclosure. Similarly, threaded portion 48 of screw rod 28 may comprise acme threads in some examples, though other types of threads are also within the scope of the present disclosure.

As shown in FIGS. 5-6, some examples of adjustable tie rods 60 may include a locking mechanism 74 (which is an example of locking mechanism 58) that is configured to prevent rotation of worm gear 68 when locking mechanism 74 is engaged. For example, locking mechanism 74 includes a thumb screw 76 that extends through a worm gear housing 78 surrounding worm gear 68. When thumb screw 76 is rotated in a first direction, it moves towards worm gear 68, and will contact worm gear 68 when thumb screw 76 is tightened sufficiently, thereby preventing rotation of worm gear 68 and locking adjustable tie rod 60 at the present overall length 34. When it is desired to further adjust overall length 34 of adjustable tie rod 60, thumb screw 76 may be rotated in the opposite direction, thereby disengaging locking mechanism 74 and allowing further rotation of worm gear 68 and thereby allowing further adjustment of overall length 34 of adjustable tie rod 60. Additionally or alternatively, adjustable tie rod 60 may be self-locking due to friction between worm gear 68 and planetary gear 64.

In the arrangement of adjustable tie rod 60, worm gear 68 is at least substantially perpendicular to threaded portion 48 of screw rod 28, though other arrangements are also within the scope of the present disclosure.

Figure 7:
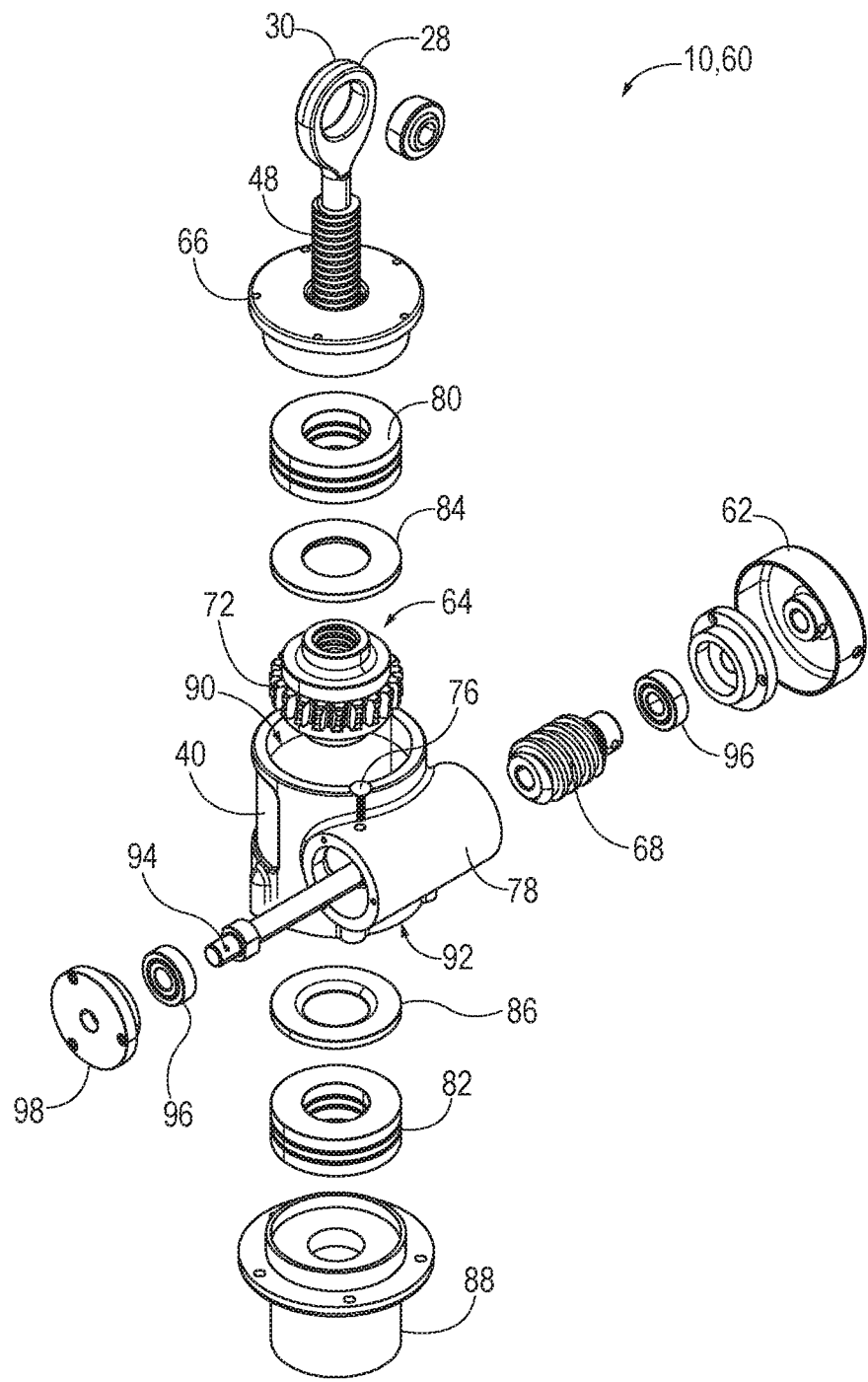
FIG. 7 is an exploded view of a portion of an example of a presently disclosed adjustable tie rod.
Figure 8:
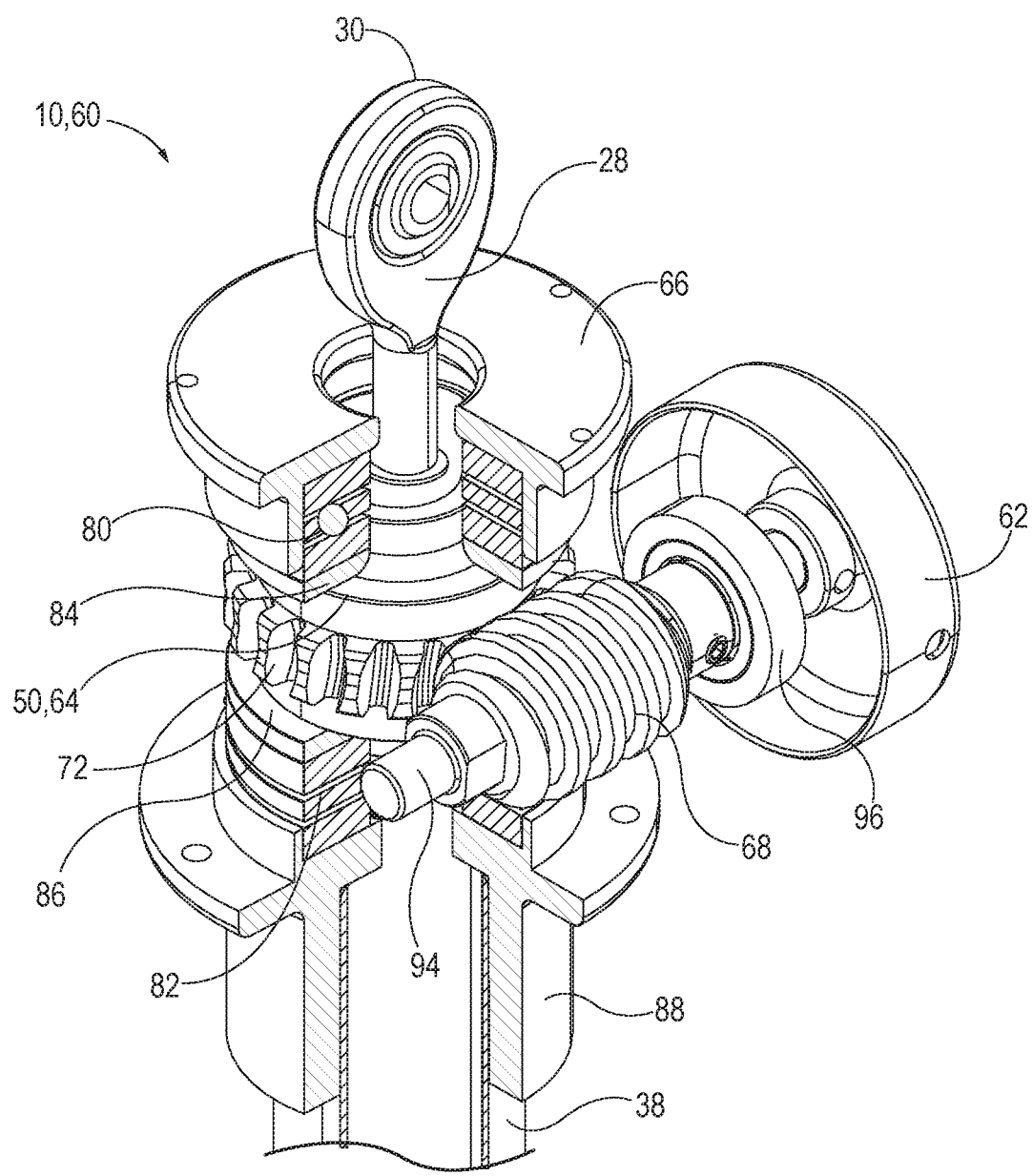
FIG. 8 is an assembled, partial cutaway view of the adjustable tie rod of FIG. 7.

Additional components of adjustable tie rod 60 are illustrated in an exploded view in FIG. 7, and in a partial cutaway view in FIG. 8 (gearbox 40, worm gear housing 78, and some associated components are not shown in FIG. 8, for clarity). While these components are illustrated and described for illustrative purposes, many different arrangements, modifications, and variations are within the scope of the present disclosure, as will be appreciated by those of ordinary skill in the art. In the illustrated example, gearbox 40 includes a first thrust bearing 80 and a second thrust bearing 82. As shown, first thrust bearing 80 and second thrust bearing 82 may be longitudinally separated from one another by planetary gear 64. Such first and second thrust bearings 80, 82 are configured to allow rotation of planetary gear 64 about longitudinal axis 36 (FIG. 6) and with respect to shaft body 38 (not shown in FIG. 7). For example, first thrust bearing 80 and second thrust bearing 82 may be configured to reduce friction losses within gearbox 40. Other examples of adjustable tie rod 60 may include more, fewer, and/or different types of bearings.

First thrust bearing 80 is generally spaced apart from planetary gear 64 by a first thrust bearing washer 84, and similarly, second thrust bearing 82 is generally spaced apart from planetary gear 64 by a second thrust bearing washer 86. Upper cap 66 may be positioned adjacent first thrust bearing 80, opposite first thrust bearing washer 84. Similarly, a lower cap 88 may be positioned adjacent second thrust bearing 82, opposite second thrust bearing washer 86. Said lower cap 88 may function to couple gearbox 40 to shaft body 38, as best seen in FIG. 8. As shown in FIG. 7, gearbox 40 may be formed with a first opening 90 to which upper cap 66 is coupled, and gearbox 40 may further include a second opening 92 to which lower cap 88 is coupled. Such first opening 90 and second opening 92 may facilitate ease of manufacturing and assembly of gearbox 40 and its components. Upper cap 66 and lower cap 88 may be fastened to gearbox 40 using any suitable hardware or fasteners.

Worm gear 68 may be operatively coupled to adjustable knob 62 via a number of components, which may include a worm shaft 94 and one or more worm gear ball bearings 96. For example, a first worm gear ball bearing 96 may be positioned between adjustable knob 62 and worm gear 68, and/or a second worm gear ball bearing 96 may be positioned between worm gear 68 and an end cap 98 (with end cap 98 being positioned on the opposite side of worm gear 68 than adjustable knob 62). Said worm shaft 94 and worm gear ball bearings 96 generally are housed within (i.e. positioned within) worm gear housing 78, with adjustable knob 62 being rotatably coupled to worm gear housing 78 such that overall length 34 of adjustable tie rod 60 may be adjusted (e.g., selectively increased and/or decreased) by rotating adjustable knob 62 with respect to worm gear housing 78. On the other hand, end cap 98 is generally fixed with respect to worm gear housing 78. Worm gear housing 78 may be integrally formed with gearbox 40 in some examples. In other examples, worm gear housing 78 may be coupled to gearbox 40 such that worm gear housing 78 is at least substantially stationary with respect to gearbox 40.

Locking mechanism 74 (e.g., thumb screw 76) may be spaced apart from adjustable knob 62 such that manipulation of adjustable knob 62 does not interfere with locking mechanism 74, and vice versa. For example, adjustable knob 62 may be positioned at one end of worm gear housing 78, while locking mechanism 74 may be positioned near or adjacent the opposite end of worm gear housing 78, such as nearer to end cap 98.

Figure 9:
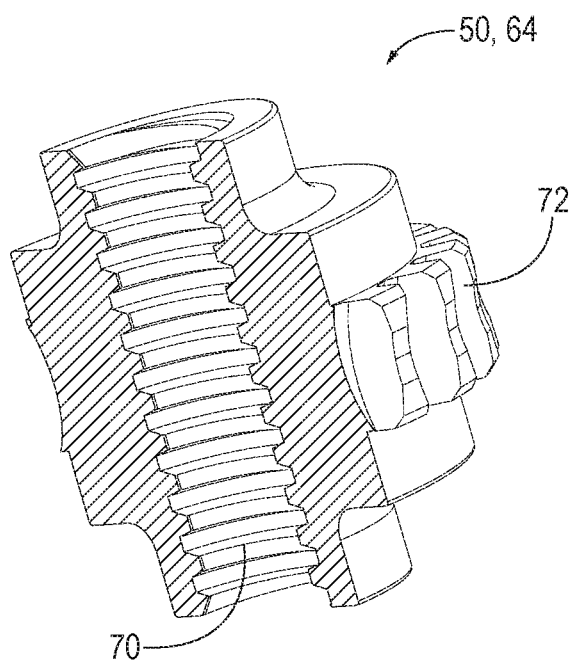
FIG. 9 is a perspective cutaway view of a planetary gear of a presently disclosed adjustable tie rod.
Figure 10:
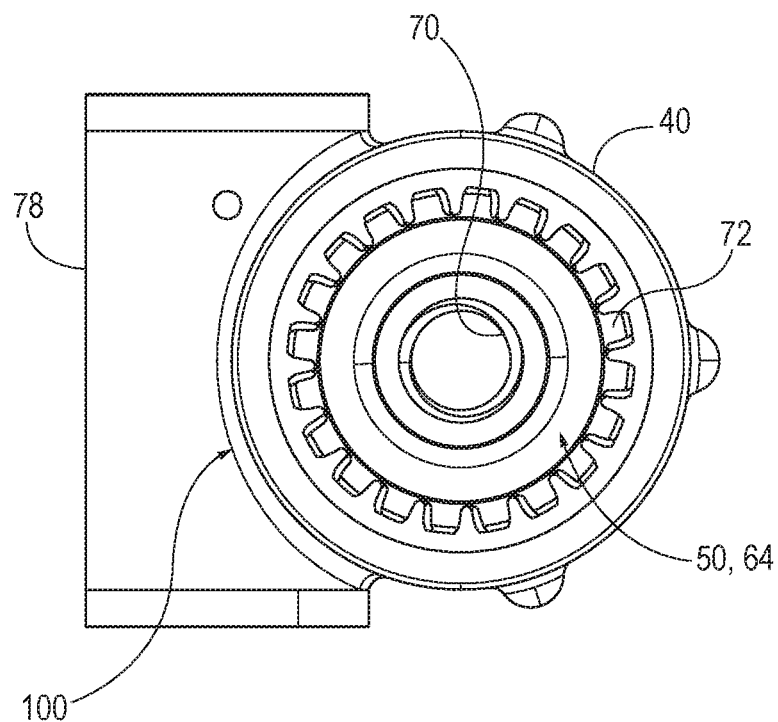
FIG. 10 is a top plan view of the planetary gear of FIG. 9, shown in position within a gearbox.
Figure 11:
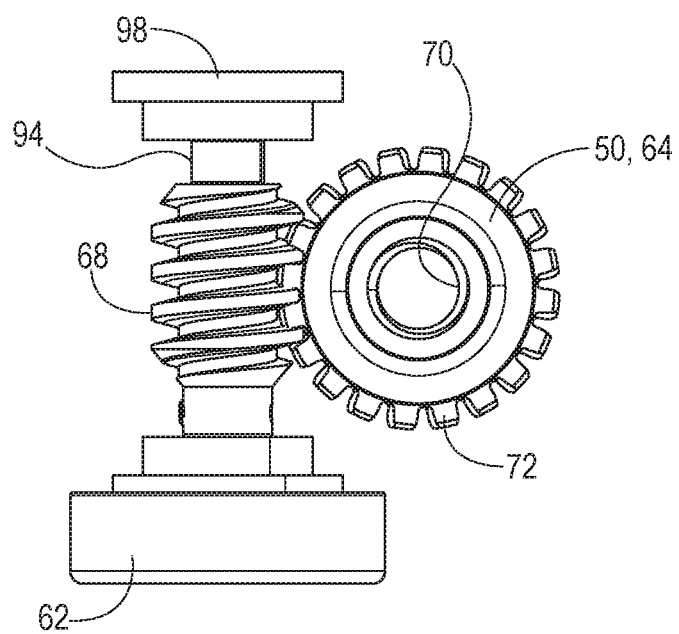
FIG. 11 is a top plan view of the planetary gear of FIG. 9, shown engaged with a worm gear.
Figure 12:
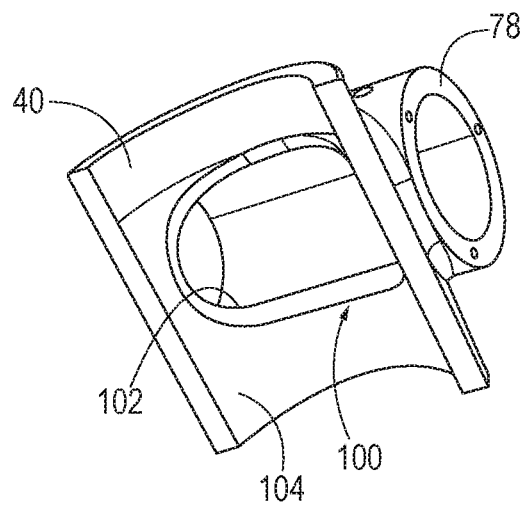
FIG. 12 is a perspective, partial cutaway view of a gearbox sidewall and worm gear housing.
Figure 13:
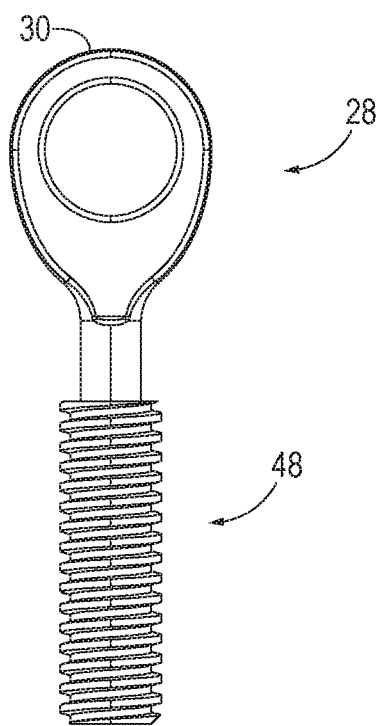
FIG. 13 is an elevation view of a screw rod of an adjustable tie rod according to the present disclosure.

FIGS. 9-13 illustrate various components shown apart from the overall adjustable tie rod 60. FIG. 9 illustrates planetary gear 64 in a perspective, cutaway view, such that both internal threaded region 70 and external threaded region 72 are visible. FIG. 10 illustrates a top plan view of planetary gear 64 positioned within gearbox 40. FIG. 10 also illustrates the positioning of planetary gear 64 with respect to worm gear housing 78 (though worm gear 68 and other relevant components are not shown in FIG. 10, for clarity). Specifically, a portion 100 of gearbox 40 encroaches into worm gear housing 78. Worm gear housing 78 and gearbox 100 are open to each other such that when worm gear 68 is positioned within worm gear housing 78, worm gear 68 is engaged with planetary gear 64 in the area of portion 100 of gearbox 40. Such positioning is illustrated in FIG. 11, which shows planetary gear 64 engaged with worm gear 68 (with gearbox 40 and worm gear housing 78 not shown, for clarity.) To further illustrate this relationship, FIG. 12 shows a perspective, cutaway view of portion 100 of gearbox 40 and worm gear housing 78, illustrating an example of portion 100 of gearbox 40 that encroaches into worm gear housing 78 to allow for mating of planetary gear 64 and worm gear 68. As shown in FIG. 12, an opening 102 in a sidewall 104 of gearbox 40 provides access for planetary gear 64 to engage (e.g., mate with) worm gear 68. Finally, FIG. 13 illustrates screw rod 28 apart from the other components of adjustable tie rod 60. In the example shown in FIG. 13, threaded portion 48 is integrally formed with screw rod 28. In other examples, threaded portion 48 may be coupled to the remainder of screw rod 28. Additionally or alternatively, threaded portion 48 may be formed by a second worm gear. In such examples, the second worm gear may be integrally formed with screw rod 28, or screw rod 28 may be inserted into an inner cavity of the second worm gear to couple the two together.

Figure 14:
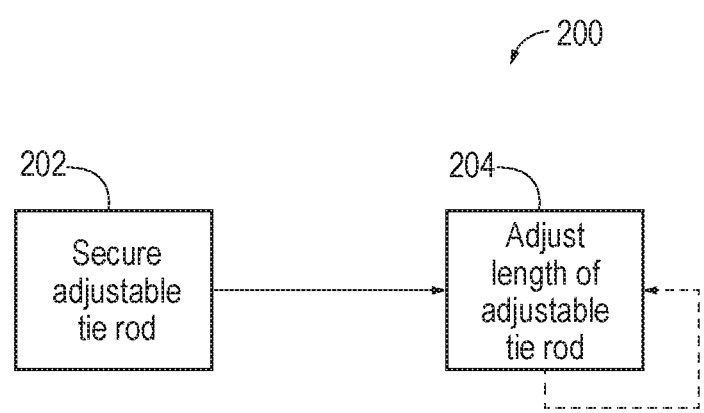
FIG. 14 is a schematic flowchart diagram of methods according to the present disclosure.

FIG. 14 schematically provides a flowchart that represents illustrative, non-exclusive examples of methods 200 according to the present disclosure. The methods 200 and steps illustrated in FIG. 14 are not limiting and other methods and steps are within the scope of the present disclosure, including methods having greater than or fewer than the number of steps illustrated, as understood from the discussions herein.

Methods 200 generally include securing a first end and a second end of an adjustable tie rod (e.g., first end 30 and second end 32 of adjustable tie rod 60) at 202, such that the first end and the second end are prevented from rotating about a longitudinal axis of the adjustable tie rod, and then adjusting the overall length of the adjustable tie rod at 204. For example, adjusting the overall length of the adjustable tie rod at 204 may include actuating an adjustment actuator (e.g., adjustment actuator 42), such as by rotating an adjustable knob (e.g., adjustable knob 62). The overall length of the adjustable tie rod may be adjusted at 204 any number of times, which, in some examples, may be accomplished without removing the adjustable tie rod from an installed configuration, and/or without requiring the use of tools, and/or without needing to unload the adjustable tie rod. The overall length of the adjustable tie rod may be selectively adjusted to increase and/or decrease the overall length of the adjustable tie rod at 204. For example, in adjustable tie rods having an adjustable knob, the overall length of the adjustable tie rod may be adjusted by rotating the knob in a first direction to increase the overall length of the adjustable tie rod and/or by rotating the knob in a second direction to decrease the overall length of the adjustable tie rod.

Illustrative, non-exclusive examples of inventive subject matter according to the present disclosure are described in the following enumerated paragraphs:

A1. An adjustable tie rod, comprising:
  a screw rod defining a first end of the adjustable tie rod, wherein the screw rod comprises a threaded portion, wherein an overall length of the adjustable tie rod is defined as a distance between the first end and a second end of the adjustable tie rod along a longitudinal axis of the adjustable tie rod;
  a tie rod shaft extending between and coupling the first end and the second end;
  a gearbox fixed with respect to the tie rod shaft; and
  an adjustable knob operatively coupled to the gearbox such that selective rotation of the adjustable knob causes translation of the screw rod along the longitudinal axis and with respect to the gearbox when the first end is prevented from rotating about the longitudinal axis, thereby adjusting the overall length of the adjustable tie rod.

A1.1. The adjustable tie rod of paragraph A1, wherein the gearbox comprises a planetary gear rotatably engaged with the threaded portion of the screw rod.

A1.2. The adjustable tie rod of paragraph A1 or A1.1, wherein the adjustable knob is configured to rotate a worm gear via selective rotation of the adjustable knob, wherein the worm gear is engaged with a/the planetary gear of the gearbox such that rotation of the worm gear causes corresponding rotation of the planetary gear about the longitudinal axis.

A1.3. The adjustable tie rod of any of paragraphs A1-A1.2, wherein rotation of a/the planetary gear of the gearbox causes translation of the screw rod along the longitudinal axis and with respect to the gearbox when the first end is prevented from rotating about the longitudinal axis, thereby adjusting the overall length of the adjustable tie rod.

A2. The adjustable tie rod of any of paragraphs A1-A1.3, wherein the threaded portion comprises a second worm gear.

A3. The adjustable tie rod of paragraph A2, wherein at least a portion of the screw rod is positioned within and fixed with respect to an inner cavity of the second worm gear.

A4. The adjustable tie rod of paragraph A2, wherein the second worm gear is integrally formed with the screw rod such that a portion of the screw rod is the second worm gear.

A5. The adjustable tie rod of any of paragraphs A1-A4, wherein the threaded portion comprises acme threads.

A6. The adjustable tie rod of any of paragraphs A1-A5, wherein the gearbox is positioned adjacent the first end.

A7. The adjustable tie rod of any of paragraphs A1-A6, wherein the gearbox is positioned such that it is closer to the first end than to the second end.

A8. The adjustable tie rod of any of paragraphs A1-A7, wherein the adjustable tie rod is configured to be adjusted in-place in a structural assembly.

A8.1. The adjustable tie rod of any of paragraphs A1-A8, wherein the adjustable tie rod is configured to be adjusted under load.

A9. The adjustable tie rod of any of paragraphs A1-A8.1, wherein the adjustable tie rod is configured to be adjusted without requiring tools.

A10. The adjustable tie rod of any of paragraphs A1-A9, wherein at least a portion of the threaded portion is positioned within a/the planetary gear of the gearbox such that the at least the portion of the threaded portion is engaged with an internal threaded region of the planetary gear.

A11. The adjustable tie rod of paragraph A10, wherein the internal threaded region comprises internal acme threads.

A12. The adjustable tie rod of any of paragraphs A1-A11, wherein a/the worm gear is positioned to engage an external threaded region of a/the planetary gear of the gearbox.

A12.1. The adjustable tie rod of paragraph A12, wherein the worm gear is coupled to the adjustable knob such that selective rotation of the adjustable knob rotates the worm gear and the planetary gear.

A13. The adjustable tie rod of any of paragraphs A1-A12.1, further comprising a locking mechanism, wherein the locking mechanism, when engaged, is configured to prevent rotation of a/the worm gear.

A14. The adjustable tie rod of paragraph A13, wherein the locking mechanism comprises a thumb screw engaged with the worm gear.

A15. The adjustable tie rod of any of paragraphs A1-A14, further comprising a/the locking mechanism, wherein the locking mechanism, when engaged, is configured to prevent changes to the overall length of the adjustable tie rod.

A16. The adjustable tie rod of any of paragraphs A1-A15, wherein a/the worm gear and a/the planetary gear of the gearbox are engaged with one another and are self-locking due to friction between the worm gear and the planetary gear.

A17. The adjustable tie rod of any of paragraphs A1-A16, wherein a/the worm gear is at least substantially perpendicular to the threaded portion of the screw rod.

A18. The adjustable tie rod of any of paragraphs A1-A17, wherein the second end comprises a clevis rod end of the adjustable tie rod.

A19. The adjustable tie rod of any of paragraphs A1-A18, wherein selective rotation of the adjustable knob in a first direction increases the overall length of the adjustable tie rod.

A20. The adjustable tie rod of any of paragraphs A1-A19, wherein selective rotation of the adjustable knob in a second direction decreases the overall length of the adjustable tie rod.

A21. The adjustable tie rod of any of paragraphs A1-A20, wherein the gearbox further comprises a first thrust bearing and a second thrust bearing, wherein the first thrust bearing and the second thrust bearing are longitudinally separated from one another by a/the planetary gear of the gearbox, and wherein the first thrust bearing and the second thrust bearing are configured to allow rotation of the planetary gear about the longitudinal axis and with respect to the tie rod shaft.

A22. The adjustable tie rod of paragraph A21, wherein the first thrust bearing and the second thrust bearing are configured to reduce friction losses in the gearbox.

A23. The adjustable tie rod of any of paragraphs A1-A22, wherein the gearbox comprises an upper cap coupled to a first opening of the gearbox.

A24. The adjustable tie rod of paragraph A23, wherein the upper cap is adjacent a/the first thrust bearing of the gearbox.

A25. The adjustable tie rod of any of paragraphs A1-A24, wherein the gearbox comprises a lower cap coupled to a second opening of the gearbox.

A26. The adjustable tie rod of paragraph A25, wherein the lower cap is adjacent a/the second thrust bearing of the gearbox.

A27. The adjustable tie rod of any of paragraphs A1-A26, further comprising a first worm gear ball bearing.

A28. The adjustable tie rod of paragraph A27, wherein the first worm gear ball bearing is positioned between the adjustable knob and a/the worm gear.

A29. The adjustable tie rod of any of paragraphs A1-A28, further comprising a second worm gear ball bearing.

A30. The adjustable tie rod of paragraph A29, wherein the second worm gear ball bearing is positioned between an end cap and a/the worm gear, wherein the end cap is opposite the adjustable knob.

A31. The adjustable tie rod of any of paragraphs A1-A30, further comprising a worm gear housing that houses a/the worm gear.

A32. The adjustable tie rod of paragraph A31, wherein the adjustable knob is rotatably coupled to the worm gear housing.

A33. The adjustable tie rod of paragraph A31 or A32, wherein a/the end cap is fixed to the worm gear housing.

A34. The adjustable tie rod of any of paragraphs A31-A33, wherein a/the first worm gear ball bearing and/or a/the second worm gear ball bearing are positioned within the worm gear housing.

A35. The adjustable tie rod of any of paragraphs A31-A34, wherein a/the thumb screw of a/the locking mechanism is positioned adjacent a/the end cap of the worm gear housing.

A36. The adjustable tie rod of any of paragraphs A1-A35, wherein the adjustable tie rod is configured for continuous adjustment of the overall length, via the adjustable knob.

A37. The adjustable tie rod of any of paragraphs A1-A35, wherein the adjustable tie rod is configured for discrete adjustment of the overall length between at least two different overall lengths, via the adjustable knob.

A38. The adjustable tie rod of any of paragraphs A1-A37, wherein at least a portion of the threaded portion of the screw rod is positioned within the gearbox.

A39. The adjustable tie rod of any of paragraphs A1-A38, wherein the first end is positioned externally to the gearbox.

A40. The adjustable tie rod of any of paragraphs A1-A39, wherein the adjustable tie rod is adjustable between a minimum overall length configuration and a maximum overall length configuration, wherein, in the minimum overall length configuration, a first proportion of the threaded portion is positioned within the gearbox, wherein, in the maximum overall length configuration, a second proportion of the threaded portion is positioned within the gearbox, and wherein the first proportion is greater than the second proportion.

A41. The adjustable tie rod of any of paragraphs A1-A40, wherein the adjustable knob is a first adjustable knob and wherein the gearbox is a first gearbox, and wherein the adjustable tie rod further comprises a second adjustable knob operatively coupled to a second gearbox such that selective rotation of the second adjustable knob causes translation of the second end along the longitudinal axis and with respect to the second gearbox when the second end is prevented from rotating about the longitudinal axis, thereby adjusting the overall length of the adjustable tie rod.

B1. An adjustable two force member, comprising:
a screw rod, wherein the screw rod defines a first end of the adjustable two force member, and wherein the screw rod comprises a threaded portion, wherein an overall length of the adjustable two force member is defined as a distance between the first end and a second end of the adjustable two force member, along a longitudinal axis of the adjustable two force member;
a shaft body extending between and coupling the first end and the second end;
a gearbox fixed with respect to the shaft body; and
an adjustment actuator operatively coupled to the gearbox such that selective actuation of the adjustment actuator causes translation of the screw rod along the longitudinal axis and with respect to the gearbox when the first end is prevented from rotating about the longitudinal axis, thereby adjusting the overall length of the adjustable two force member.

B2. The adjustable two force member of paragraph B1, wherein the adjustment actuator comprises one or more selected from the group comprising a push button, an electronic control, a ratchet, a knob, and a switch.

B3. The adjustable two force member of any of paragraphs B1-B2, wherein the adjustable two force member is configured for continuous adjustment of the overall length via the adjustment actuator.

B4. The adjustable two force member of any of paragraphs B1-B2, wherein the adjustable two force member is configured for discrete adjustment of the overall length between at least two different overall lengths via the adjustment actuator.

B5. The adjustable two force member of any of paragraphs B1-B4, wherein the adjustable two force member comprises the adjustable tie rod of any of paragraphs A1-A41.

B6. The adjustable two force member of any of paragraphs B1-B5, wherein the adjustment actuator is a first adjustment actuator, wherein the adjustable two force member further comprises a second adjustment actuator, and wherein selective actuation of the second adjustment actuator causes translation of the second end along the longitudinal axis and with respect to a second gearbox when the second end is prevented from rotating about the longitudinal axis, thereby adjusting the overall length of the adjustable two force member.

C1. An aircraft, comprising the adjustable tie rod of any of paragraphs A1-A41 and/or the adjustable two force member of any of paragraphs B1-136.

D1. A method, comprising:
securing a first end and a second end of an adjustable tie rod such that the first end and the second end are prevented from rotating about a longitudinal axis of the adjustable tie rod, wherein the adjustable tie rod comprises:
a screw rod, wherein the screw rod defines the first end, wherein the screw rod comprises a threaded portion, wherein the second end is opposite the first end, and wherein an overall length of the adjustable tie rod is defined as a distance between the first end and the second end along the longitudinal axis of the adjustable tie rod;
a tie rod shaft extending between and coupling the first end and the second end;
a gearbox fixed with respect to the tie rod shaft; and
an adjustment actuator operatively coupled to the gearbox such that selective actuation of the adjustment actuator causes translation of the screw rod along the longitudinal axis and with respect to the gearbox; and actuating the adjustment actuator, thereby adjusting the overall length of the adjustable tie rod.

D1.1. The method of paragraph D1, wherein the actuating the adjustment mechanism comprises rotating an adjustable knob, thereby adjusting the overall length of the adjustable tie rod, wherein the adjustable knob is operatively coupled to the gearbox such that selective rotation of the adjustable knob causes translation of the screw rod along the longitudinal axis and with respect to the gearbox.

D2. The method of paragraph D1 or D1.1, wherein the adjustable tie rod is the adjustable tie rod of any of paragraphs A1-A41 or the adjustable two force member of any of paragraphs B1-66.

D3. The method of any of paragraphs D1.1-D2, wherein the rotating the adjustable knob comprises rotating the adjustable knob in a first direction, thereby increasing the overall length of the adjustable tie rod.

D4. The method of any of paragraphs D1.1-D3, wherein the rotating the adjustable knob comprises rotating the adjustable knob in a second direction, thereby decreasing the overall length of the adjustable tie rod.

D5. The method of any of paragraphs D1.1-D4, wherein the rotating the adjustable knob causes translation of the screw rod along the longitudinal axis, with respect to the gearbox and the tie rod shaft.

E1. The use of the adjustable tie rod of any of paragraphs A1-A41 or the adjustable two force member of any of paragraphs B1-B6 to accommodate tolerance variations and stack-ups during assembly or installation of an aircraft.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

The invention claimed is:

1. An adjustable tie rod, comprising:
  a screw rod defining a first end of the adjustable tie rod, wherein the screw rod comprises a threaded portion, wherein an overall length of the adjustable tie rod is defined as a distance between the first end and a second end of the adjustable tie rod, along a longitudinal axis of the adjustable tie rod;
  a tie rod shaft extending between and coupling the first end and the second end;
  a gearbox fixed with respect to the tie rod shaft, wherein the gearbox comprises a planetary gear rotatably engaged with the threaded portion of the screw rod;
  an adjustment actuator operatively coupled to the gearbox such that selective actuation of the adjustment actuator causes translation of the screw rod along the longitudinal axis and with respect to the gearbox when the first end is prevented from rotating about the longitudinal axis, thereby adjusting the overall length of the adjustable tie rod, wherein the adjustment actuator comprises an adjustable knob configured to rotate a worm gear via selective rotation of the adjustable knob, wherein the worm gear is engaged with the planetary gear of the gearbox such that rotation of the worm gear causes corresponding rotation of the planetary gear about the longitudinal axis, and a locking mechanism, wherein the locking mechanism, when engaged, is configured to prevent rotation of the worm gear, thereby preventing changes to the overall length of the adjustable tie rod when the locking mechanism is engaged, and wherein the locking mechanism comprises a thumb screw engaged with the worm gear.

2. The adjustable tie rod according to claim 1, wherein rotation of the planetary gear causes translation of the screw rod along the longitudinal axis and with respect to the gearbox when the first end is prevented from rotating about the longitudinal axis, thereby adjusting the overall length of the adjustable tie rod.

3. The adjustable tie rod according to claim 1, wherein at least a portion of the threaded portion is positioned within the planetary gear and engaged with an internal threaded region of the planetary gear.

4. The adjustable tie rod according to claim 1, wherein the worm gear is positioned to engage an external threaded region of the planetary gear.

5. The adjustable tie rod according to claim 1, wherein the worm gear is coupled to the adjustable knob such that selective rotation of the adjustable knob rotates the worm gear and the planetary gear.

6. The adjustable tie rod according to claim 1, wherein the gearbox further comprises a first thrust bearing and a second thrust bearing, wherein the first thrust bearing and the second thrust bearing are longitudinally separated from one another by the planetary gear, and wherein the first thrust bearing and the second thrust bearing are configured to allow rotation of the planetary gear about the longitudinal axis and with respect to the tie rod shaft.

7. The adjustable tie rod according to claim 1, further comprising:
a first worm gear ball bearing, wherein the first worm gear ball bearing is positioned between the adjustable knob and the worm gear; and
a second worm gear ball bearing, wherein the second worm gear ball bearing is positioned between the worm gear and an end cap of a worm gear housing that houses the worm gear.

8. The adjustable tie rod of according to claim 1, wherein selective rotation of the adjustable knob in a first direction increases the overall length of the adjustable tie rod, and wherein selective rotation of the adjustable knob in a second direction decreases the overall length of the adjustable tie rod.

9. The adjustable tie rod according to claim 1, wherein the adjustable tie rod is adjustable between a minimum overall length configuration and a maximum overall length configuration, wherein, in the minimum overall length configuration, a first proportion of the threaded portion is positioned within the gearbox, wherein, in the maximum overall length configuration, a second proportion of the threaded portion is positioned within the gearbox, and wherein the first proportion is greater than the second proportion.

10. The adjustable tie rod according to claim 1, wherein the overall length of the adjustable tie rod is configured to be adjusted in-place in a structural assembly.

11. The adjustable tie rod according to claim 1, wherein the overall length of the adjustable tie rod is configured to be adjusted under load.

12. An aircraft comprising at least one adjustable tie rod according to claim 1.

13. An adjustable tie rod, comprising:
a screw rod that defines a first end of the adjustable tie rod, wherein the screw rod comprises a threaded portion, wherein an overall length of the adjustable tie rod is defined as a distance between the first end and a second end of the adjustable tie rod, along a longitudinal axis of the adjustable tie rod;
a tie rod shaft extending between and coupling the first end and the second end;
a gearbox fixed with respect to the tie rod shaft, wherein the gearbox comprises a planetary gear rotatably engaged with the threaded portion of the screw rod such that at least a portion of the threaded portion is positioned within the planetary gear and engaged with an internal threaded region of the planetary gear;
an adjustable knob configured to rotate a worm gear and the planetary gear via selective rotation of the adjustable knob, wherein the worm gear is engaged with an external threaded region of the planetary gear of the gearbox such that rotation of the worm gear causes corresponding rotation of the planetary gear about the longitudinal axis, and wherein selective rotation of the adjustable knob thereby causes translation of the screw rod along the longitudinal axis and with respect to the gearbox when the first end is prevented from rotating about the longitudinal axis, thereby adjusting the overall length of the adjustable tie rod;
a worm gear housing surrounding the worm gear, wherein the adjustable knob is rotatably coupled to the worm gear housing; and
a locking mechanism, wherein the locking mechanism, when engaged, is configured to prevent rotation of the worm gear, thereby preventing changes to the overall length of the adjustable tie rod when the locking mechanism is engaged, and wherein the locking mechanism comprises a thumb screw that extends through the worm gear housing such that the thumb screw is configured to be selectively engaged with the worm gear.

14. A method, comprising:
securing a first end and a second end of an adjustable tie rod such that the first end and the second end are prevented from rotating about a longitudinal axis of the adjustable tie rod, wherein the adjustable tie rod comprises:
a screw rod, wherein the screw rod defines the first end, wherein the screw rod comprises a threaded portion, wherein the second end is opposite the first end, and wherein an overall length of the adjustable tie rod is defined as a distance between the first end and the second end along the longitudinal axis of the adjustable tie rod;
a tie rod shaft extending between and coupling the first end and the second end;
a gearbox fixed with respect to the tie rod shaft, wherein the gearbox comprises a planetary gear rotatably engaged with the threaded portion of the screw rod;

an adjustable knob operatively coupled to the gearbox such that selective rotation of the adjustable knob causes translation of the screw rod along the longitudinal axis and with respect to the gearbox, wherein the adjustable knob is configured to rotate a worm gear when the adjustable knob is rotated, wherein the worm gear is engaged with the planetary gear of the gearbox such that rotation of the worm gear causes corresponding rotation of the planetary gear about the longitudinal axis; and a locking mechanism, wherein the locking mechanism, when engaged, is configured to prevent rotation of the worm gear, thereby preventing changes to the overall length of the adjustable tie rod when the locking mechanism is engaged, and wherein the locking mechanism comprises a thumb screw engaged with the worm gear;

rotating the adjustable knob, thereby adjusting the overall length of the adjustable tie rod by translating the screw rod along the longitudinal axis, with respect to the gearbox and the tie rod shaft; and engaging the locking mechanism by rotating the thumb screw until the thumb screw contacts the worm gear, thereby preventing further rotation of the worm gear and further adjustment of the overall length of the adjustable tie rod while the locking mechanism is so engaged.

15. The method according to claim 14, wherein the rotating the adjustable knob comprises:

rotating the adjustable knob in a first direction, thereby increasing the overall length of the adjustable tie rod; and rotating the adjustable knob in a second direction, thereby decreasing the overall length of the adjustable tie rod.

16. The method according to claim 14, wherein the rotating the adjustable knob is performed while the adjustable tie rod is in-place in a structural assembly.

17. The adjustable tie rod according to claim 13, wherein the thumb screw is configured such that selective rotation of the thumb screw in a first direction causes the thumb screw to move towards the worm gear until the thumb screw contacts the worm gear, thereby preventing rotation of the worm gear and further thereby preventing changes to the overall length of the adjustable tie rod, and wherein the thumb screw is configured such that selective rotation in a second direction opposite from the first direction, causes the thumb screw to move away from the worm gear, thereby disengaging the locking mechanism to allow adjustment of the overall length of the adjustable tie rod.

18. The adjustable tie rod according to claim 13, wherein the thumb screw is spaced apart from the adjustable knob such that manipulation of the adjustable knob does not interfere with the locking mechanism.

19. The adjustable tie rod according to claim 13, wherein the adjustable knob is configured to be selectively rotated by hand, without the use of tools.

20. The adjustable tie rod according to claim 13, wherein the worm gear housing comprises an end cap that is fixed with respect to the worm gear housing, wherein the end cap is opposite the adjustable knob.

* * * * *